Figure 1:
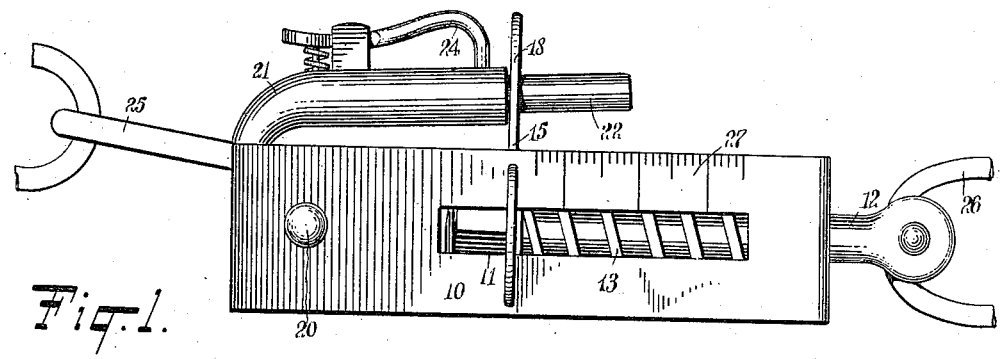

N. A. NIEMIE.
CLEVIS.
APPLICATION FILED APR. 6, 1910.

975,786.

Patented Nov. 15, 1910.

WITNESSES:
George Bambay.

INVENTOR
Nels A. Niemie
BY
ATTORNEYS

UNITED STATES PATENT OFFICE.

NELS A. NIEMIE, OF McKENZIE, NORTH DAKOTA.

CLEVIS.

975,786.

Specification of Letters Patent. Patented Nov. 15, 1910.

Application filed April 6, 1910. Serial No. 553,714.

*To all whom it may concern:*

Be it known that I, NELS A. NIEMIE, a citizen of the United States, and a resident of McKenzie, in the county of Burleigh and State of North Dakota, have invented a new and Improved Clevis, of which the following is a full, clear, and exact description.

My invention relates to clevises, particularly adapted for use on plows and like agricultural implements, and has for an object to provide an adjustable clevis for connection between a drawing and a drawn member, to release the drawn member from the drawing member should the drawn member become caught in any manner so as to impede its progress and place it in danger of breakage.

For the purpose mentioned, use is made of a frame provided with a spring-controlled pull rod, a clevy bar mounted on the frame and capable of adjustment, and a locking plate secured to the pull rod and removably engaged by the clevy bar, the said plate being adapted to slide on the frame.

Reference is to be had to the accompanying drawings forming a part of this specification, in which similar characters of reference indicate corresponding parts in all the views, and in which—

Figure 2:
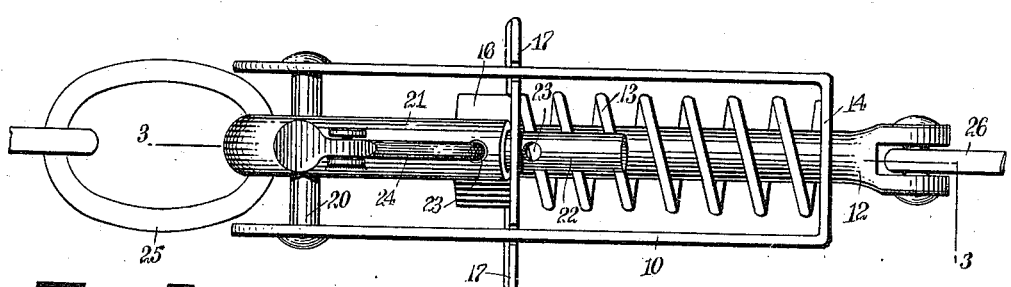
Figure 3:
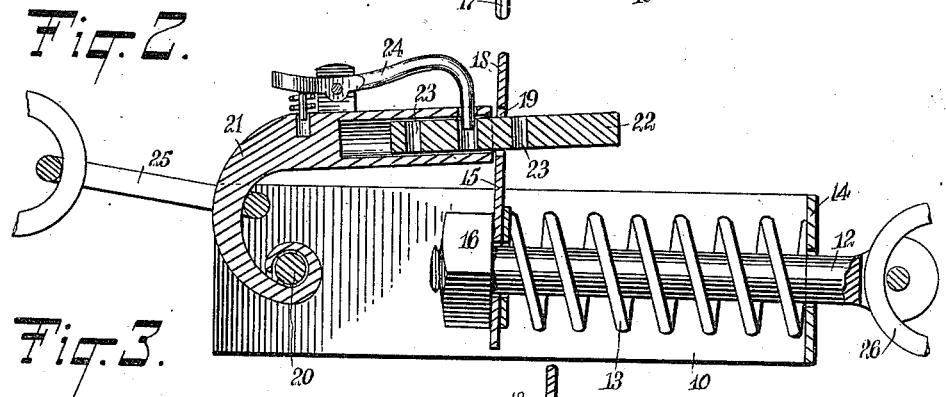
Figure 4:
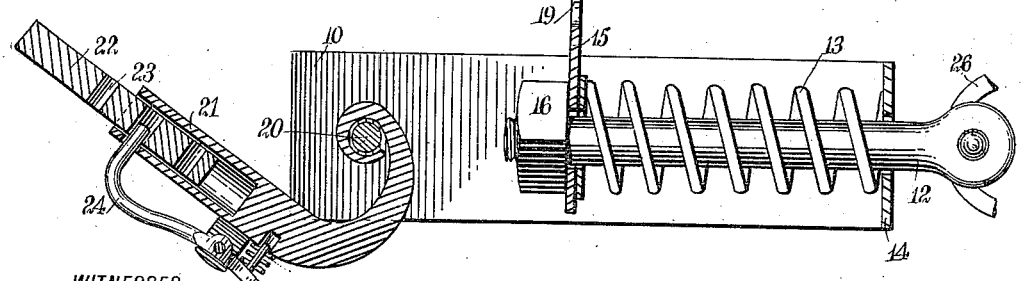

Figure 1 is a side elevation of my clevis; Fig. 2 is a plan view of my clevis; Fig. 3 is a sectional view taken on the line 3—3 in Fig. 2, and showing the various parts in normal position, and Fig. 4 is a similar sectional view, but showing the clevy bar released from the locking plate.

Referring more particularly to the various views, I employ a U-shaped casing 10 having similar slots 11 therein, and mounted in the casing is a pull rod 12 controlled by a compression spring 13 encircling the rod 12. The spring 13 is held in position by abutting against the end 14 of the casing, and a locking plate 15 held on the pull rod 12 by the nut 16. The locking plate 15 comprises outwardly-extending lugs 17 for holding the plate on the frame so that it can slide in the slots 11, and an upwardly-projecting lug 18 is provided on the plate 15 and has therein a hole 19.

Transversely disposed through the casing at one end of the same is a pivot or bearing 20 and hingedly mounted thereon is a clevy bar 21 provided with a slidable extension 22. A series of holes 23 are provided in the extension 22, and mounted on the clevy bar 21 is a spring-controlled lever 24 adapted to engage the holes 23 for adjusting the length of the extension 22 outside of the clevy bar 21.

As shown in Figs. 1, 2 and 3, a suitable link 25 is provided for connecting the clevis to a drawing member such as a horse or the like, and a similar link 26 is provided for connecting the other end of the clevis to a drawn member such as a plow or the like. The frame 10 is provided on one side of the same with a series of graduations 27 adapted to correspond in value to the strength of the spring 13 or the pull of the rod 12.

The operation of my device is as follows: Suppose the clevis is connected with a plow and a horse, and the horse is pulling the plow over the ground in the regular manner. Now suppose that the plow suddenly strikes a stone, and the horse is not strong enough to dislodge the stone. The tremendous strength of the horse pulling against the stone ordinarily would tend to break the harness or the plow, but my device being attached to the plow in the manner shown in Fig. 1, the pull of the horse will disengage the plate 15 from the clevy bar 21 and the clevy bar will spring to the position shown in Fig. 4, thereby releasing the link 25 from the clevy bar, and disconnecting the plow and horse. Any strain is now eliminated, and the stone can be either dug away or the plow lifted around it; when the plow and horse are quickly re-connected and the plowing resumed as heretofore mentioned.

It will be understood that although I have shown and described a particular construction of my device, I do not limit myself thereto, the scope of my invention being fully defined in the appended claims.

Having thus described my invention, I claim as new and desire to secure by Letters Patent:

1. A clevis comprising a frame, a pull rod on the frame, a clevy bar hingedly mounted on the frame, a locking plate secured to the pull rod and adapted to slide on the frame, with the said clevy bar removably engaging the plate, and means on the clevy bar for adjusting the same.

2. A clevis comprising a frame, a pull rod on the frame, an adjustable clevy bar hingedly mounted on the frame, a locking plate secured to the pull rod and adapted to slide on the frame, with the said clevy bar removably engaging the plate, and spring-controlled means in the clevy bar for adjusting the length of the same.

3. A clevis comprising a U-shaped frame, a pull rod on the frame, a clevy bar hingedly mounted on the frame, a locking plate secured to the pull rod and adapted to slide in the frame, with the said clevy bar removably engaging the plate, and spring-controlled means on the clevy bar for adjusting the length of the same.

4. A clevis comprising a U-shaped frame, a spring-controlled pull rod on the frame, a clevy bar hingedly mounted on the frame, a locking plate secured to the pull rod and adapted to slide on the frame, with the clevy bar removably engaging the plate, and means on the clevy bar for adjusting the same.

5. A clevis comprising a U-shaped frame, a spring-controlled pull rod on the frame, an adjustable clevy bar hingedly mounted on the frame, a locking plate secured to the pull rod and adapted to slide on the frame, with the clevy bar removably engaging the plate, and spring-controlled means on the clevy bar for adjusting the same.

6. A clevis comprising a slotted U-shaped frame, a spring-controlled pull rod on the frame, an adjustable clevy bar hingedly mounted on the frame, a locking plate secured to the pull rod and adapted to slide in the slots in the frame, with the clevy bar removably engaging the plate, and spring-controlled means on the clevy bar for adjusting the same.

7. A clevis comprising a double slotted U-shaped frame, a spring-controlled pull rod on the frame, an adjustable clevy bar hingedly mounted on the frame, a locking plate secured to the pull rod and adapted to slide on the frame, with the clevy bar removably engaging the plate, graduations on the frame, and spring-controlled means on the clevy bar for adjusting the same.

8. A clevis comprising a double slotted U-shaped frame, a spring-controlled pull rod on the frame, an adjustable clevy bar hingedly mounted on the frame, a locking plate on the pull rod and mounted to slide on the frame, lugs on the locking plate, graduations on the frame adapted to indicate the strength of the spring for the pull rod, and spring-controlled means on the clevy bar for manually adjusting the length of the same.

In testimony whereof I have signed my name to this specification in the presence of two subscribing witnesses.

NELS A. NIEMIE.

Witnesses:
P. P. BLISS,
ISAAC KENNILA.